United States Patent Office 3,634,244
Patented Jan. 11, 1972

3,634,244
LUBRICANT HAVING IMPROVED VISCOSITY INDEX
Robert J. Herold and Herbert C. Kaufman, Akron, Ohio, assignors to The General Tire & Rubber Company
No Drawing. Filed June 13, 1969, Ser. No. 833,197
Int. Cl. C10m 1/28, 1/38
U.S. Cl. 252—48.2
10 Claims

ABSTRACT OF THE DISCLOSURE

Alkylene polyethers soluble in mineral oil and having a molecular weight above 10,000 are utilized as viscosity index improving additives in lubricating oil compositions. The polyethers are made by polymerization of alkylene oxides, oxetanes and episulfides in the presence of a catalyst, e.g., a double metal cyanide complex type catalyst like zinc hexacyanoferrate diglyet complex. The improved lubricants contain about 1 to 15 parts of the polyether per 100 parts of base oil.

BACKGROUND OF THE INVENTION

It is known the viscosities of lubricating oils, which operate well within certain temperature ranges, become too low at elevated temperatures and too high at reduced temperatures. Both of these effects are detrimental to the proper functioning of the lubricant. When the viscosity becomes too low, a continuous lubricating film cannot be maintained on the surface requiring lubrication. The thinned oil may also leak too readily. When the viscosity is too high, it becomes difficult to transport the oil to the lubricated surfaces, and, once there, the oil may absorb a significant amount of power.

A variety of oil additives have been used, to mitigate the lubricant viscosity problem. Their function is to lower the viscosity-temperature gradient of the base oil. Such additives are usually known as viscosity index improvers, the term viscosity index being an inversely proportional measure of the viscosity-temperature gradient of the lubricant between 100° F. and 210° F., i.e., the lower the viscosity-temperature gradient, the higher the viscosity index.

Among the viscosity index improvers known in the art are a variety of polymeric substances including some which are of the polyether class. However, such prior use of polyethers in lubricants has been limited to low molecular weight polyethers, e.g., about 1500 or less (see U.S. 2,481,278; 2,492,953 and 2,510,540).

Polyethers of molecular weight in the range of 10,000 to 100,000 have been prepared by polymerization of alkylene oxides, e.g., ethylene oxide, propylene oxide, etc. Double metal cyanide complexes permit such high molecular weights to be attained (see U.S. 3,278,457 to 3,278,459).

OBJECTS OF THE INVENTION

A principal object of the invention is to provide novel lubricating oil compositions having improved viscosity indices. Further objects include the provision of:

(1) A new group of polymeric viscosity index improving additives, which additives are economical to prepare.

(2) New lubricating compositions that utilize relatively high molecular weight, oil-soluble polyethers as viscosity index improving additives.

Other objects, and the broad scope of applicability of the invention, will become apparent from the disclosure that follows. It should be understood, however, that the detailed description and specific examples provided hereinbelow, while indicating preferred embodiments of the invention, are given by way of illustration only; and that various changes and modifications, within the spirit and scope of the invention, will become apparent to those skilled in the art from this detailed description.

SUMMARY OF THE INVENTION

The accomplishment of the objects of the invention is based on the discovery that alkylene polyethers, having molecular weights ranging from 10,000 to 100,000, impart improved viscosity indices when added to lubricating oils. Preferably from 1 to 15 parts by weight of such polymers are used per 100 parts of base oil.

The polyethers to be used in the invention are liquid to semi-solid. They are the products of polymerization or telomerization of cyclic oxides containing 2 to 18 carbon atoms and having an oxygen-carbon ring in which an oxygen atom is joined to 2 or 3 carbon atoms, which oxide will open and telomerize with the same or other cyclic oxide monomers under such catalytic conditions as will bring about the formation of relatively high-molecular polymers. Advantageously one uses as the catalysts in preparing such polymers, the double metal cyanide complex type catalyst, e.g., see U.S. Pats. 3,278,457–9, the disclosures of which are incorporated herein by reference.

The term "alkylene polyether" as used in this specification and the accompanying claims means the polymer formed by homopolymerization, or copolymerization of several monomers within the stated class, of monomer material having the following general formula:

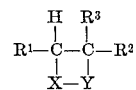

wherein

X is oxygen or sulfur,
Y is —$CH_2$— or the bond in the cyclic ether between the carbon atom and the heteroatom X, and
$R^1$, $R^2$ and $R^3$ are hydrogen, hydrocarbon, halohydrocarbon, carbon oxycarbon, carbonthiacarbon, halocarbonoxycarbon or halocarbonthiacarbon radicals.

Advantageously, such monomers are organic cyclic oxide monomers having a ring of 2 to 3 carbon atoms and 1 oxygen atom, the oxide being an epoxide, oxetane, 3-substituted oxetane or 3,3-disubstituted oxetane. Mixtures of any of the cyclic ethers as defined may be employed or different monomers may be charged into the reaction sequentially.

Lubricating oil compositions in accordance with the invention comprise a base oil and, as a viscosity index improver, 1 to 15% by weight of a polyether having a molecular weight ranging from 10,000 to 100,000. Preferably, such polyether will be selected from the group consisting of (a) the product of polymerizing an organic compound containing 2 to 18 carbon atoms and having at least one oxide ring in which the oxygen atom is attached to 2 or 3 carbon atoms; (b) the product of copolymerizing two organic compounds, at least one of which contains 2 to 18 carbon atoms and having at least one oxide ring in which the oxygen atom is attached to 2 or 3 carbon atoms; (c) a blend of two or more polymers as described in (a); (d) a blend of two or more copolymers as described in (b); (e) a blend of at least one polymer as described in (a) with at least one copolymer as described in (b).

DISCLOSURE OF PREFERRED EMBODIMENTS

The following details of operation and reported data illustrate the further principles and practice of the invention to those skilled in the art. In these examples, and throughout the remaining specification and the claims, all parts and percentages are by weight unless otherwise specified.

EXAMPLE 1

Prepartion of $Zn_3[Co(CN)_6]_2$ polymerization catalyst

Two aqueous solutions were prepared, one consisting of 55.04 grams of calcium cobalticyanide in 400 mls. of water and the other consisting of 44.98 grams of zinc chloride (10% excess) in 200 mls. of water. The former was added dropwise to the latter. The double salt formed, zinc cobalticyanide, was separated by centrifuging and washed three times with acetone, each washing being followed by centrifugation. The catalyst was then placed in a vacuum oven. Upon complete drying, it was pulverized, using a mortar and pestle, to a white powder.

EXAMPLE 2

Preparation of polybutene oxide 0.01 part of the catalyst prepared in Example 1, along with 30 parts of 1,2-butene oxide were placed in a pint bottle which was then roated overnight in a 25° C. constant temperature bath. The polymeric product at the end of the run was a tacky solid.

EXAMPLE 3

Viscosity index improving characteristics of PBO

White mineral oil was used to prepare a 20% solution of PBO prepared in Example 2. The oil initially had the following characteristics:

Viscosity (Cs.) at 210° F. _____ 5.0
Viscosity (Cs.) at 100° F. _____ 36.0
Viscosity index _____ 53.5

This same oil was then used to test the viscosity improving characteristics of the 20% PBO solution and to compare it with two commercially known viscosity index improvers, namely "Acryloid" (polyalkyl methacrylate in mineral oil, concentration unknown) and "Paratone" (polyisobutylene in mineral oil, concentration unknown). Six samples of the white mineral oil were prepared, two for each of the PBO solutions (Samples I and II), the "Acryloid" (Samples III and IV), and the "Paratone" (Samples V and VI). The viscosity characteristics of these samples were measured and the resulting data are reported in Table 1.

TABLE 1

| Sample No. | 1 | II | III | IV | V | VI |
| --- | --- | --- | --- | --- | --- | --- |
| Concentration (percent by weight) | 5 | 10 | 5 | 10 | 5 | 10 |
| Viscosity (cs.) at 210° F | 5.90 | 8.37 | 7.21 | 11.3 | 6.27 | 9.20 |
| Viscosity (cs.) at 100° F | 42.6 | 58.0 | 47.1 | 68.3 | 47.3 | 70.3 |
| Viscosity index | 86 | 121 | 117 | 141 | 85 | 114 |
| Inherent viscosity (cs.) at 210° F | 1.44 | | 3.20 | | 1.93 | |
| Inherent viscosity (cs.) at 100° F | 1.49 | | 2.34 | | 2.38 | |
| Relative inherent viscosity | 0.97 | | 1.37 | | 0.83 | |

The term "inherent viscosity" is a measure of the thickening power of the particular additive, in the particular oil, and at the particular temperature. It is calculated using the following formula:

$$\text{I.V.} = \frac{1}{C}\left[\log \frac{V_b}{V_o}\right](100)$$

where
I.V.=inherent viscosity at a certain temperature,
C=the concentration (percent by weight) of the particular additive in the oil,
$V_b$=viscosity of the blend at that temperature,
$V_o$=viscosity of the base oil at that temperature.

The term "relative inherent viscosity" is a product of dividing the inherent viscosity at the higher temperature (210° F.) by the inherent viscosity at the lower temperature (100° F.). The value of the concentration "C" remains constant for the determination of relative inherent viscosity for any given additive. It provides a measure of the effectiveness of the particular additive as a viscosity index improver. Thus, according to the tabulated results above, the PBO solution is more effective than the "Paratone" but less effective than the "acryloid."

EXAMPLE 4

Preparation of propylene oxide-butylene oxide copolymer

The following ingredients were charged to a one gallon reactor:

| | Gms. |
| --- | --- |
| Zinc cobalticyanide catalyst (prepared in Example 1) | 1.5 |
| Propylene oxide: 1,2-butylene oxide (1:3 ratio) | 266 |
| Tetrahydrofurane (THF) | 1333 |
| 1,4-butanediol (0.03 mole) | 3.8 |

The mixture was heated at 50° C. for 20 hours. Additional amounts of the propylene oxide-1,2-butylene oxide mixture were then added at the rate of about 60 grams each hour for 18 hours and a total addition of 1067 grams. One function of the THF was to limit the isomerization of the butylene oxide and mitigate lowering of the molecular weight. At the end of the run, a total of 1314 grams of copolymer (98.5% yield) was obtained.

An analysis of the molecular weight distribution of the copolymer product was made by gel permeation chromatography. The chromatograph indicated high molecular weight fractions. The calculated molecular weight based upon the 0.03 moles of the telogen was 44,000.

EXAMPLE 5

Viscosity index improving characteristics of the copolymer

The product of Example 4 was dissolved in a paraffinic mineral oil at two concentrations and the viscosity characteristics were measured and compared with those of the same oil containing "Acryloid" and "Paratone." The results are reported in Table 2.

TABLE 2

| Additive | Viscosity (c.s.) at 100° F. | Viscosity (c.s.) at 210° F. | Viscosity index | Relative inherent viscosity |
| --- | --- | --- | --- | --- |
| None | 32.7 | 5.4 | 107 | |
| 3.25% copolymer | 44.2 | 7.7 | 156 | 1.18 |
| 6.5% copolymer | 60.3 | 10.9 | 188 | 1.25 |
| 10% acryloid | 64.0 | 14.7 | 257 | 1.50 |
| 10% paratone | 77.8 | 11.5 | 151 | 0.88 |

EXAMPLE 6

The same procedure was followed as in Example 4 except that no 1,4-butanediol was used in order to obtain a higher molecular weight copolymer. This product was subjected to gel permeation chromatography, and again the chromatograph indicated the presence of high molecular weight fractions.

EXAMPLE 7

The viscosity index improving characteristics of the product of Example 6 were tested, again using a mineral oil base. The results are shown in Table 3 below.

TABLE 3

| | Viscosity (c.s.) at— | | Viscosity index | Relative inherent viscosity |
|---|---|---|---|---|
| | 100° F. | 210° F. | | |
| Base Oil | 32.7 | 5.4 | 107 | |
| With 2.25% copolymer | 44.9 | 8.2 | 172 | 1.3 |
| With 4.50% copolymer | 62.4 | 12.1 | 208 | 1.25 |

DISCUSSION OF DETAILS

The majority of polymers, used in the prior art for increasing the viscosity indices of lubricating oils, have been based on the polymerization of monomers through carbon-to-carbon double bond. The best of these polymers are prepared from somewhat polar monomers, using free radical catalytic polymerization. This type of polymerization is inherently limited to the preparation of copolymers whose structures are predetermined by the nature of the monomers involved.

Polyethers, on the other hand, are best produced by anionic or coordinate anionic catalytic polymerization. Through this type of polymerization a wide variety of copolymer structures can be obtained using the same monomers. These include block copolymers, and chain-branched polymers and copolymers. Thus, a wide range of variation in the properties of the polymerized viscosity index improving product is possible, to suit the particular lubricant to which it is to be added.

Telomers prepared by telomerization of monomers of the type represented by the general formula given hereinbefore in the presence of a telogen may advantageously be used as the new viscosity index improvers. Preparation of such telomers are disclosed in copending application Ser. No. 676,612, filed Oct. 20, 1967, and Ser. No. 643,036, filed June 2, 1967, the disclosures of which are incorporated herein by reference.

In preparing polyethers for use according to the teachings of the invention, the polymerization catalyst used must be such as will bring about the formation of high molecular weight polymers or copolymers. Two types of catalysts are particularly applicable, namely double metal complex cyanides, and alkali metal hydroxides. The latter, however, are limited in their range of applicability, i.e., the polymerization of certain epoxides, such as propylene oxide, in the presence of an alkali metal hydroxide catalyst will produce only relatively low molecular weight polyethers. Accordingly, the double metal cyanide complex catalysts are preferred.

It should of course be noted here that other factors, beside the type of polymerization catalyst, will affect the molecular weight of the polymerized product, such as the amount of telogen used, the temperature of polymerization, the length of time of the reaction, etc.

As noted earlier, the polyethers contemplated for use in this invention are liquid to semi-solid, and they range in molecular weight from 10,000 to 100,000. A preferred molecular weight range is 10,000 to 30,000. The proportion used in oil may range from about 1 to about 15%.

The preparation of a copolymer which would be useful for practicing the invention should take into consideration the carbon-to-oxygen ratios in the monomers employed. It is presumed, for example, that generally epoxide monomers in which the carbon-to-oxygen ratio is below 3:1 will give oleophobic polymers; whereas, generally epoxide monomers having carbon-to-oxygen ratios over 4:1 will give oleophilic polymers. A combination of one or more of each type of monomer may, therefore, be called for to obtain polymers having the requisite viscosity index improving properties. The following five combinations are provided by way of illustration:

| Combination | Oleophobic monomer | Oleophilic monomer |
|---|---|---|
| 1 | Propylene oxide | 1,2-epoxy octane. |
| 2 | Ethylene oxide | Do. |
| 3 | Propylene oxide and ethylene oxide | Phenyl glycidyl ether. |
| 4 | Allyl glycidyl ether | Do. |
| 5 | Methyl glycidyl ether | 1,2 epoxy hexane. |

The proportions in these and like combinations would be determined on the basis of solubility and viscosity index improving efficiency of the resulting polymer desired.

The class of monomers used in preparing polyethers for use in the invention is not limited to the epoxides. One may, for example, use oxetanes as well as minor amounts of a cyclic anhydride to form small amounts of ester linkages in the polyether. Also, one may use episulfides in accordance with the teachings of the invention, to obtain high molecular weight polymeric additive that would be particularly useful in connection with very high pressure lubricants.

The viscosity index improving additives of the invention are particularly useful in petroleum or mineral oils, such as used to lubricate internal combustion engines, turbines, bearings, gears and so forth. However, this should not be deemed to negate possible utility in other types of lubricating oils including animal, vegetable, and synthetic oils. And oil compositions containing the viscosity index improving additives of the invention may also contain other additives such as antioxidants, stabilizers, gelling agents, etc.

The embodiments of the invention in which an exclusive property or right is claimed are defined as follows:

1. A lubricating oil comprising major amounts of a hydrocarbon base oil of lubricating viscosity and about 1 to 15 parts by weight per 100 parts by weight of the base oil of a viscosity index improver which consists of a polymer of 1,2-butane oxide having a molecular weight between about 10,000 and 100,000.

2. A lubricating oil comprising major amounts of a hydrocarbon base oil of lubricating viscosity and about 1 to 15 parts by weight per 100 parts by weight of the base oil of a viscosity index improver which consists of a copolymer of 1,2-butane oxide and 1,2-butene oxide having a molecular weight between about 10,000 and 100,000.

3. A lubricating oil comprising major amounts of a hydrocarbon base oil of lubricating viscosity and about 1 to 15 parts by weight per 100 parts by weight of the base oil of a viscosity index improver which consists of a copolymer having a molecular weight between about 10,000 and 100,000 of two alkylene oxides containing 2 to 18 carbon atoms and one heterocyclic ring containing 2 to 3 carbon atoms and one oxygen atom.

4. The lubricating oil of claim 3 wherein one of said alkylene oxides of said copolymer has a carbon-to-oxygen ratio below 3 to 1 and the other has a carbon-to-oxygen ratio over 4 to 1.

5. The lubricating oil of claim 3 wherein one of said alkylene oxides of said copolymer is propylene oxide and the other is 1,2-epoxy octane.

6. The lubricating oil of claim 3 wherein one of said alkylene oxides of said copolymer is ethylene oxide and the other is 1,2-epoxy octane.

7. The lubricating oil of claim 3 wherein one of said alkylene oxides of said copolymer is allyl glycidyl ether and the other is phenyl glycidyl ether.

8. The lubricating oil of claim 3 wherein one of said alkylene oxides of said copolymer is methyl glycidyl ether and the other is 1,2-epoxy hexane.

9. A lubricating oil comprising major amounts of a hydrocarbon base oil of lubricating viscosity and about 1 to 15 parts by weight per 100 parts by weight of the base oil of a viscosity index improver which consists of a homopolymer having a molecular weight between about 10,000 and 100,000 of an hydrocarbyl cyclic ether or a halohydrocarbyl cyclic ether selected from the group consisting of epoxides, episulfides and oxetanes containing up to 18 carbon atoms.

10. The lubricating oil of claim 9 wherein said homopolymer was formed in the presence of a double metal cyanide complex catalyst.

References Cited

UNITED STATES PATENTS

| | | | |
|---|---|---|---|
| 2,481,278 | 9/1949 | Ballard et al. | 260—2 Ep A |
| 2,510,540 | 6/1950 | Ballard et al. | 260—615 B |
| 2,619,508 | 11/1952 | Mikeska et al. | 252—48.2 |
| 3,239,567 | 3/1966 | Kaufman | 252—52 |
| 3,278,459 | 10/1966 | Herold | 260—2 Ep A |

DANIEL E. WYMAN, Primary Examiner

W. H. CANNON, Assistant Examiner

U.S. Cl. X.R.

252—52 A, 56 R